United States Patent [19]

Schmidt

[11] Patent Number: 5,170,824
[45] Date of Patent: Dec. 15, 1992

[54] WOOD CHUCK FOR A VENEER LATHE

[76] Inventor: Charles J. Schmidt, P.O. Box 757, Diboll, Tex. 75941

[21] Appl. No.: 878,939

[22] Filed: May 5, 1992

[51] Int. Cl.$^5$ .............................................. B27C 7/04
[52] U.S. Cl. .................................. 142/53; 144/209 R
[58] Field of Search ........................... 142/53, 55, 57; 144/209 R, 209 A; 82/150

[56] References Cited

U.S. PATENT DOCUMENTS

| | | | |
|---|---|---|---|
| 4,141,397 | 2/1979 | Schmidt | 142/53 X |
| 4,271,881 | 6/1981 | Hitt | 142/53 X |
| 4,342,348 | 8/1982 | Lichtenwalter et al. | 142/53 X |
| 4,531,435 | 7/1985 | Walser | 144/209 R X |
| 4,754,788 | 7/1988 | Schmidt | 142/53 X |

Primary Examiner—Steven C. Bishop
Attorney, Agent, or Firm—Fulbright & Jaworski

[57] ABSTRACT

A chuck having first and second ends is provided with releasably fastening means at the first end for connection to a veneer lathe. The second end includes a plurality of blades extending from the longitudinal axis to the outer periphery. The backside includes an angled inward portion adjacent the outer edge for aiding the entry into a log. The leading edge includes an outwardly rounded portion adjacent the outer edge and the outer edge is outwardly rounded. The rounded portion and rounded outer edge tend to more firmly grip the ends of a log. The blades may be curved, straight or wave shaped.

6 Claims, 2 Drawing Sheets

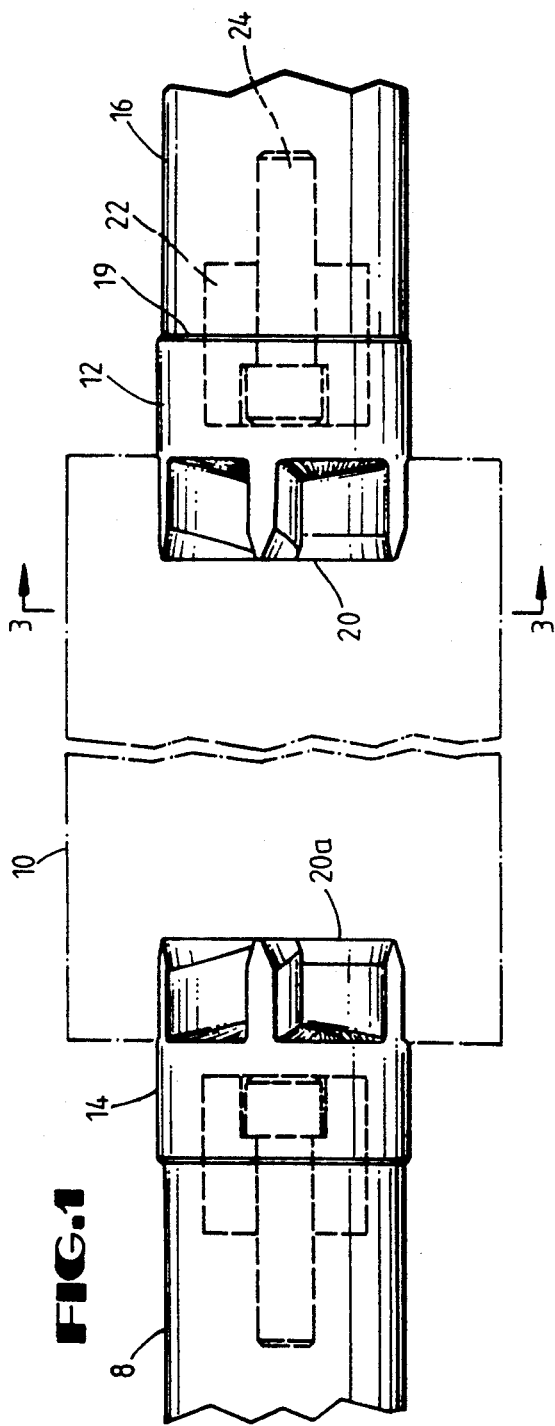
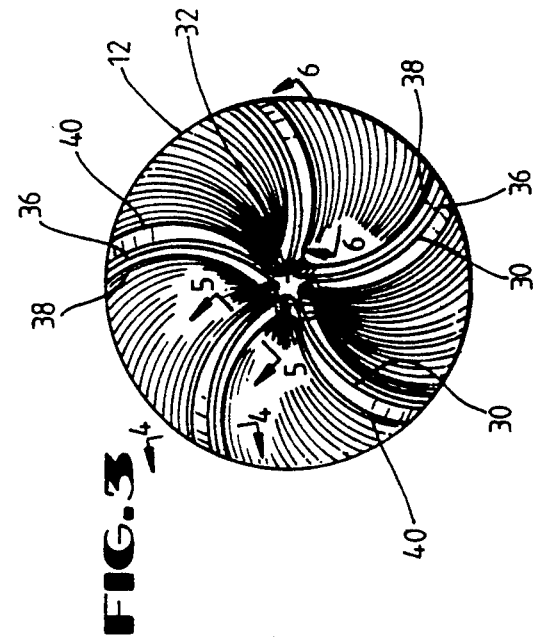
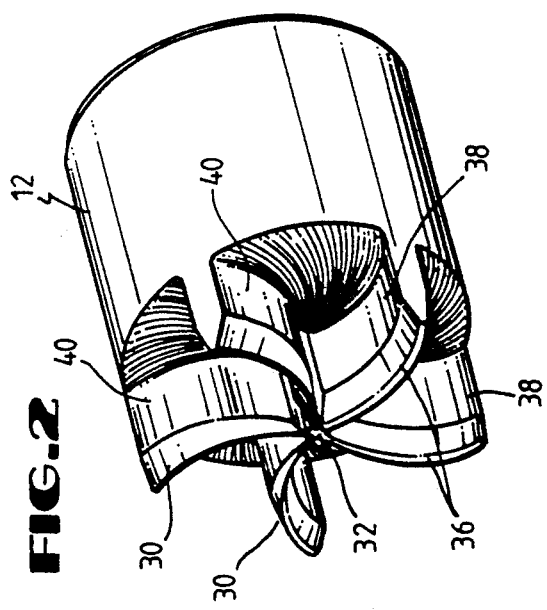

WOOD CHUCK FOR A VENEER LATHE

BACKGROUND OF THE INVENTION

The present invention relates to a wood chuck used to hold logs on a veneer cutting lathe. And more particularly the invention includes a wood chuck having a gripping end for more securely holding the ends of a log and reducing the occurrences of spin outs, and split log ends.

It is well known to support wood logs in a plywood lathe chuck for cutting veneer from the logs from the outer diameter thereof. The ends of the logs are supported by chucks attached to the rotary spindles of the lathe as illustrated in the following patents: U.S. Pat. Nos. 4,141,397; 4,271,881 and 4,342,348.

In order to utilize the maximum amount of wood from the logs and use less expensive raw material it is desirable to peel a log down to the smallest feasible diameter. This generally requires that the chuck must be not larger than the smallest diameter to which the log is peeled. Therefore, because of the small gripping area between the chucks and ends of the log the chucks are not able to securely grip and hold the ends of the log when cutting veneer. That is, the chucks will frequently split the ends of the log, and in many instances "spin out" will occur which is the condition that happens when the chucks lose their grip on the ends of the logs and spin relatively to the logs. Of course, split ends and spin outs delay production, increase expense, and create excess wasted materials.

Therefore, the present invention is the provision of wood chucks for use in a veneer lathe that more securely grip the ends of logs and reduce spin outs and splitting of the log ends.

SUMMARY OF THE INVENTION

The present invention is directed to a wood chuck for use in a veneer lathe which includes a chuck body having first and second ends. Releasably fastening means are connectable to the first end for releasably connecting the chuck body to a veneer lathe. The second end of the chuck body includes a plurality of blades extending from the longitudinal axis of the body outwardly to the outer periphery of the body. Each of the blades includes an outer edge, a leading side and a back side. The back side includes an angled inwardly portion adjacent to the outer edge for aiding the entry of the leading edge into a log. The leading side includes an outwardly rounded portion adjacent the outer edge and the outer edge is outwardly rounded. The rounded portion of the leading side and the rounded outer edge tend to more firmly grip the ends of a log and have no sharp edges tending to split and shear the ends of the logs as they are rotated under load.

Still a further object of the present invention is wherein the leading side is concave shaped from the axis towards the periphery and the back side is convex shaped from the axis toward the periphery.

Still a further object of the present invention is wherein the rounded portion on the leading side is connected to the rounded outer edge for providing a continuous rounded surface which is devoid of sharp corners which cut into and dislodge from the log ends.

Still a further object of the present invention is wherein the rounded portion on the leading side forms an angled inwardly portion for increasing the thickness and thus the strength of the blades.

A still further object of the present invention is wherein the width of the angled inwardly portion of the back side increases from the longitudinal axis towards the outer periphery.

Still a further object of the present invention is wherein the blades are wave shaped in the direction from the longitudinal axis towards the outer periphery thereby maximizing the contact area between the blades and the end of a log.

Other and further objects, features and advantages will be apparent from the following description of presently preferred embodiments of the invention, given for the purpose of disclosure, and taken in conjunction with the accompanying drawings.

BRIEF DESCRIPTION OF THE DRAWINGS

FIG. 1 is a fragmentary elevational view, partly in section, illustrating a log being held in between two chucks of the present invention, FIG. 2 is a perspective view of a right handed chuck of the present invention, FIG. 3 is an end view of chuck of FIG. 2.

DESCRIPTION OF THE PREFERRED EMBODIMENT

Figure 4:
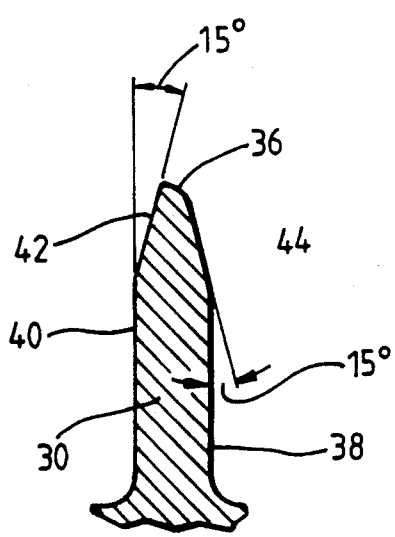
FIG. 4 is a cross-sectional view taken along the line 4—4 of FIG. 3.

Referring now to the drawings, and particularly to FIG. 1, a wood log 10, shown in dotted outline, is secured between a right handed chuck 12 and left handed chuck 14 in a conventional plywood veneer lathe. Each of the chucks 12 and 14 are supported from a drive spindle such as drive spindles 16 and 18, respectively. As is conventional, the spindles 16 and 18 may be axially extended, such as by hydraulic cylinders (not shown) to drive the chucks 12 and 14 into oposite ends of the log 10 and are thereafter rotated and plywood veneer is peeled from the outer surface of the log 10. The right handed chuck 12 and the left handed chuck 14 are mirror images of each other. Therefore, for purposes of description, only the right-handed chuck 12 will be described in detail and corresponding parts on the left-handed chuck 14 will be numbered similarly to the parts of chuck 12 with the addition of the suffix "a". The chuck 12 includes a first end 19 and a second end 20. The first end 19 includes releasable fastening means which is connectable to the drive spindle 16. Any suitable releasable fastening means may be utilized, such as the type disclosed in my U.S. Pat. No. 4,141,397. However, the preferable and industry standard is to provide a threaded drive adapter 22 which is connected to the spindle 16 by a bolt 24.

The second end 20 of the chuck 12 includes a plurality of blades 30, here shown as five blades although any suitable number may be provided. The blades 30 extend from the longitudinal axis 32 of the chuck 12 to the outer periphery of the body of the chuck 12. Each of the blades 30 include an outer edge 36, a leading side 38 and back side 40.

Figure 5:
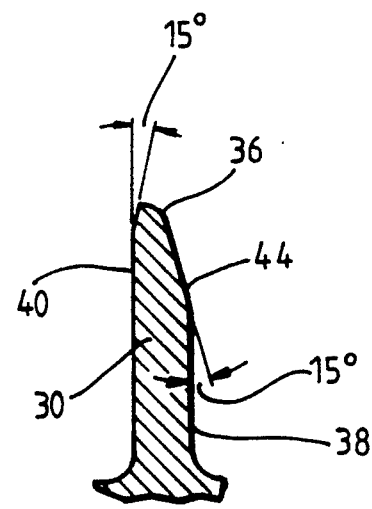
FIG. 5 is a cross-sectional view taken along the line 5—5 of FIG. 3.

Referring now particularly to FIGS. 4 and 5 the blades 30 are shown in cross-section showing the outer edge 36, the leading side 38 and the back side 40. First, it is noted that the back side includes an angled inwardly portion 42, for example only, at an angle of 15°, which is adjacent the outer edge 36 for providing a sharp point at the trailing or back side 40 for aiding the entry of the outer edge 36 into the end of a log 10. This also allows the base of the blades 30 to be thicker and have greater strength.

It is also to be noted that the outer edge 36 is rounded and that the leading side 38 includes an outwardly rounded portion 44. It is important that the rounded edge 36 and rounded portion 44 form a continuous rounded surface without any sharp corners. Conventional blades have square corners at the outer edge and between the outer edge and the leading side. Thus, when the chuck drives and applies a torque to the end of the logs the square corners and shoulders bite into the wood shearing the wood causing end splits and spin outs. However, the rounded surfaces 36 and 44 do not dig into, break or shear the wood, but instead seem to have the tendency to engage the wood, when under torque with a tension force instead of a shearing force. For example, in one test using a conventional four bladed wood chuck the conventional chuck caused eighteen spin outs in one hour. In a test with the present invention, 3,000 logs were run through a veneer lathe without any spin outs. The outwardly rounded portion 44 also forms generally an angled inwardly portion, for example, approximately 15° for illustration only, which again insures that the outer edge 36 of the blades 30 may easily penetrate into the logs but the base of the blades will have sufficient strength to provide greater torque to the logs.

Figure 6:
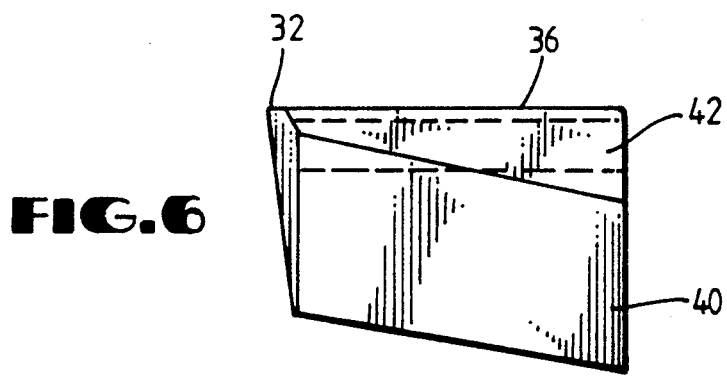
FIG. 6 is a development view taken along the line 6—6 of FIG. 3.

Referring now to FIG. 6, it is to be noted that the width of the angled inwardly portion 42 of the back side 40 of the blades 30 increases from the longitudinal axis 32 to the outer periphery of the chuck 12. This is for the purpose of keeping outer edge 36 approximately the same width from axis 32 to the outer periphery. While the leading edge 38 and backside 40 are thinner toward axis 32 than the outer periphery so as to displace less wood.

While the radially extending shapes of the blades 30 may be of any desired shape such as straight, it is preferred that the blades 30 be curved as best seen in FIGS. 1-6. That is, the leading sides 38 of the blades 30 is concave shaped from the axis 32 to the outer periphery and the back sides 40 are convex shaped from the axis 32 towards the outer periphery.

Figure 7:
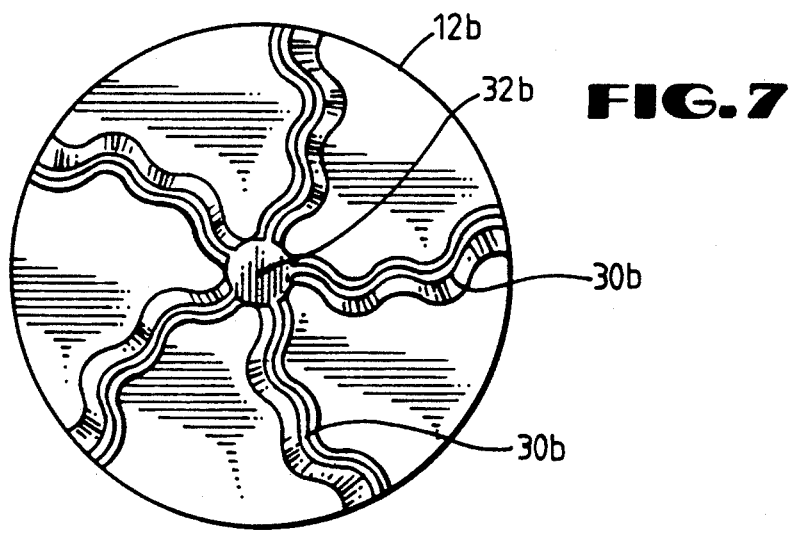
FIG. 7 is an end view of another embodiment of a chuck according to the present invention.

However, another possible shape is best seen in the embodiment of FIG. 7 wherein like parts to those shown in FIGS. 1-6 are similarly numbered with the addition of the suffix "b". In this case, the cross-sectional shape of the blades 30b is similar to those shwon in FIGS. 1-6, but the blades 30b are waved shaped in the direction from the longitudinal axis 32b towards the outer periphery thereby maximizing the contact area between the blades 30b and the ends of a log 10. This maximum area aids in providing maximum torque to a log 10 having a minimum diameter. This wave shape grips the ends of the log 10 and limits the radial expansion of the ends of the log.

For purposes of illustration only, tests have been run on chucks 12 and 14 having an outside diameter of 3.5 inches and a length of 4.0 inches. The height of the blades 30 varied from 1.0 inches at the center to 1.25 inches at the outer periphery. The radius of the rounded outer edge 36 was 0.125 inches and the radius of the rounded portion 44 on the leading side 38 was 0.625 inches.

The present invention, therefore, is well adapted to carry out the objects and attain the ends and advantages mentioned as well as others inherent therein. While presently preferred embodiments of the invention have been give for the purpose of disclosure, numerous changes in the details of construction, and arrangement of parts, will readily suggest themselves to those skilled in the art which are encompassed within the spirit of the invention and the scope of the appended claims.

What is claimed is:

1. A wood chuck for use in a veneer lathe comprising, a chuck body having first and second ends, releasable fastening means connectable to the first end for releasably connecting the chuck body to a veneer lathe, said second end of the chuck body including a plurality of blades extending from the longitudinal axis of the body of the outer periphery of the body, each of said blades including an outer edge, a leading side, and a back side, said back side including an angled inwardly portion adjacent the outer edge for aiding the entry of the leading edge into a log, said leading side including an outwardly rounded portion adjacent the outer edge, and said outer edge being outwardly rounded, said rounded portion and said rounded outer edge tending to more firmly grip the ends of a log.

2. The chuck of claim 1 wherein the leading side is concave shaped from the axis toward the periphery, and the back side is convex shaped from the axis toward the periphery.

3. The chuck of claim 1 wherein the rounded portion on the leading side is connected to the rounded outer edge for providing a continuous rounded surface.

4. The chuck of claim 1 wherein the rounded portion on the leading side forms an angled in portion for reducing the thickness of the outer end of the blade.

5. The chuck of claim 1 wherein the width of the angled inwardly portion of the back side increases from the longitudinal axis toward the outer periphery.

6. The chuck of claim 1 wherein the blades are wave shaped in the direction from the longitudinal axis toward the outer periphery thereby maximizing the contact area between the blades and the end of a log.

* * * * *

UNITED STATES PATENT AND TRADEMARK OFFICE
CERTIFICATE OF CORRECTION

PATENT NO. : 5,170,824

DATED : December 15, 1992

INVENTOR(S) : Charles J. Schmidt

It is certified that error appears in the above-identified patent and that said Letters Patent is hereby corrected as shown below:

Column 3, line 56, delete "shwon" and replace it with -- shown --

Column 4, line 18, delete "give" and replace it with -- given --

Column 4, line 31" delete the first occurrence of "of" and replace it with -- to --

Signed and Sealed this

Second Day of November, 1993

Attest:

BRUCE LEHMAN

*Attesting Officer*      *Commissioner of Patents and Trademarks*